US008942836B2

(12) United States Patent
Inoue et al.

(10) Patent No.: US 8,942,836 B2
(45) Date of Patent: Jan. 27, 2015

(54) SOUND EFFECT GENERATING DEVICE

(75) Inventors: Toshio Inoue, Tochigi-ken (JP); Yasunori Kobayashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 546 days.

(21) Appl. No.: 13/380,679

(22) PCT Filed: Feb. 8, 2010

(86) PCT No.: PCT/JP2010/051767

§ 371 (c)(1), (2), (4) Date: Dec. 23, 2011

(87) PCT Pub. No.: WO2011/001701

PCT Pub. Date: Jun. 1, 2011

(65) Prior Publication Data

US 2012/0101611 A1 Apr. 26, 2012

(30) Foreign Application Priority Data

Jun. 30, 2009 (JP) ................................ 2009-155406

(51) Int. Cl.
*G06F 17/00* (2006.01)
*G10K 15/02* (2006.01)

(52) U.S. Cl.
CPC ........ *G10K 15/02* (2013.01); *G10K 2210/1282* (2013.01); *G10K 2210/3213* (2013.01)
USPC .................................. 700/94; 381/61; 381/86

(58) Field of Classification Search
None
See application file for complete search history.

(56) References Cited

U.S. PATENT DOCUMENTS

| | | | | |
|---|---|---|---|---|
| 5,371,802 | A | 12/1994 | McDonald et al. | |
| 5,635,903 | A | 6/1997 | Koike et al. | |
| 7,062,049 | B1 | 6/2006 | Inoue et al. | |
| 7,340,065 | B2 | 3/2008 | Nakamura et al. | |
| 2004/0240678 | A1 | 12/2004 | Nakamura et al. | |
| 2004/0247137 | A1 | 12/2004 | Inoue et al. | |
| 2006/0215846 | A1 * | 9/2006 | Kobayashi et al. | ............. 381/61 |
| 2007/0230716 | A1 | 10/2007 | Kobayashi et al. | |
| 2007/0234879 | A1 | 10/2007 | Kobayashi et al. | |
| 2009/0028353 | A1 | 1/2009 | Kobayashi et al. | |

FOREIGN PATENT DOCUMENTS

| | | | |
|---|---|---|---|
| JP | 6-9298 | U | 2/1994 |
| JP | 9-60515 | A | 3/1997 |
| JP | 2000-172281 | A | 6/2000 |
| JP | 2000-280831 | A | 10/2000 |

(Continued)

OTHER PUBLICATIONS

Extended Search Report issued in European Application No. 10 79 3872.2, dated Jan. 18, 2013, 8 pages.

*Primary Examiner* — Fan Tsang
*Assistant Examiner* — David Siegel
(74) *Attorney, Agent, or Firm* — Carrier Blackman & Associates, P.C.; William D. Blackman; Jeffrey T. Gedeon

(57) ABSTRACT

A control signal generating means of a sound effect generating device sets the reference volume that is the reference value of the volume of a sound effect when a vehicle is in a predetermined travel state, compares the measured volume of the sound effect detected by a sound effect detecting means when the vehicle is in the predetermined travel state and the reference volume, and corrects the gain of a control signal on the basis of the result of the comparison.

6 Claims, 5 Drawing Sheets

(56) References Cited

FOREIGN PATENT DOCUMENTS

| | | | |
|---|---|---|---|
| JP | 2002-354599 | A | 12/2002 |
| JP | 2004-354657 | A | 12/2004 |
| JP | 2006-193002 | A | 7/2006 |
| JP | 2007-264125 | A | 10/2007 |
| JP | 2007-264485 | A | 10/2007 |
| JP | 2008-213755 | A | 9/2008 |
| JP | 2008-216783 | A | 9/2008 |
| JP | 2008-244766 | A | 10/2008 |

* cited by examiner

SOUND EFFECT GENERATING DEVICE

CROSS-REFERENCE TO RELATED APPLICATION

This Application is a National Stage entry of International Application No. PCT/JP2010/051767, having an international filing date of Feb. 8, 2010; which claims priority to Japanese Application No.: 2009-155406, filed Jun. 30, 2009, the disclosure of each of which is hereby incorporated in its entirety by reference.

TECHNICAL FIELD

The present invention relates to a sound effect generating device for generating a sound effect such as a vehicular pseudo-engine sound or the like.

BACKGROUND ART

Sound effect generating devices, which serve as equipment for enhancing an acoustic effect in vehicle passenger compartments (hereinafter referred to as ASC (ASC: Active Sound Control) devices) are known (see, for example, U.S. Patent Application Publication No. 2006/0215846, U.S. Pat. No. 5,635,903, and Japanese Laid-Open Patent Publication No. 2006-193002).

According to U.S. Patent Application Publication No. 2006/0215846, a plurality of reference signals (Sr1, Sr2, Sr3) depending on engine rotational frequency [Hz] are generated. After a predetermined gain correcting process is performed on the reference signals, the reference signals are combined into a control signal (Sc) for generating a sound effect. Then, a gain correcting process depending on a change [Hz/s] in the engine rotational frequency per unit time is performed on the control signal (see, for example, FIGS. 12 and 14 of the U.S. Patent Application Publication).

According to U.S. Pat. No. 5,635,903, pseudo-sound signals corresponding to vehicle operating states including starting, traveling, accelerating, and decelerating of an electric vehicle are generated, and levels of the pseudo-sound signals are changed depending on the level of ambient noise, in order to switch between volume levels of the pseudo-sounds (see, for example, the summary and claim 1 of the U.S. patent).

According to Japanese Laid-Open Patent Publication No. 2006-193002, a pseudo-engine sound is increased or decreased depending on sounds in the vehicle passenger compartment (see, for example, the summary and claim 1 of the Japanese Laid-Open Patent publication).

SUMMARY OF INVENTION

Although in each of the above publications, a pseudo-sound (sound effect) is adjusted depending on the task to be achieved, much still remains to be improved. For example, the above publications do not take into account performance variations and aging of individual units of the sound effect output means (e.g., speakers).

The present invention has been made in view of the above problems. It is an object of the present invention to provide a sound effect generating device, which is capable of compensating for performance variations and aging of a sound effect output means.

A sound effect generating device according to the present invention includes traveling state detecting means for detecting a traveling state of a mobile body, a waveform data table for storing one period of waveform data, reference signal generating means for generating a reference signal of a certain order by successively reading the waveform data from the waveform data table based on the traveling state, acoustic control means for generating a control signal based on the reference signal, gain adjusting means for storing a first gain table, which stores a gain for the control signal in association with the traveling state, reading the gain from the first gain table depending on the traveling state, which is detected by the traveling state detecting means, and outputting the control signal, which is adjusted in gain using the gain, and sound effect output means for outputting a sound effect corresponding to the control signal, which is adjusted in gain, wherein the sound effect generating device further comprises sound effect detecting means, disposed in an evaluating position near a passenger, for detecting the sound effect at the evaluating position, gain comparing means for storing a second gain table, which stores a predicted gain for the control signal at the evaluating position, the predicted gain representing the gain for the control signal in the first gain table as reflecting a signal transfer characteristic from the sound effect output means to the sound effect detecting means, and comparing the predicted gain and a measured gain of the sound effect, which is detected by the sound effect detecting means, and gain correcting means for correcting the gain for the control signal, which is adjusted in gain, based on the result of the comparison from the gain comparing means.

According to the present invention, the gain for the control signal, which represents the sound effect, is corrected based on the result of the comparison between the predicted gain for the sound effect based on the traveling state of the mobile body (e.g., at least one of an engine rotational frequency, an engine rotational frequency change, a rotational frequency of a traction motor, a rotational frequency change of a traction motor, a vehicle speed, and a vehicle speed change). Therefore, even if the measured gain of the sound effect varies due to aging of the sound effect output means, the output level of the sound effect output means is kept constant when the vehicle is in a prescribed traveling state, and hence aging of the sound effect output means can be compensated for. If the predicted gain is shared by a plurality of sound effect generating devices, then it is also possible to compensate for performance variations of the sound effect generating devices.

The gain comparing means may comprise predicted gain identifying means for identifying a predicted gain of the certain order based on the second gain table, and measured gain detecting means for detecting a measured gain of the certain order from the sound effect at the evaluating position. It is thus possible to identify the predicted gain and the measured gain based on only the certain order, and thus the predicted gain and the measured gain can be identified with higher accuracy than if the order were not identified.

The measured gain detecting means may comprise an adaptive notch filter for outputting a second control signal based on the reference signal of the certain order, removing means for outputting a removed signal representing the sound effect at the evaluating position from which the second control signal has been removed, and filter coefficient updating means for sequentially updating a filter coefficient of the adaptive notch filter in order to minimize a component of the certain order of the removed signal based on the reference signal of the certain order and the removed signal, wherein the filter coefficient of the adaptive notch filter is detected as the measured gain of the certain order.

The gain comparing means may compare the predicted gain and the measured gain with each other at a frequency for setting the gain for the control signal to a relatively large value with the acoustic control means, from among control frequencies for the control signal. Alternatively, the gain correcting means may correct the gain for the control signal at a frequency for setting the gain for the control signal to a relatively large value with the acoustic control means.

A sound effect generating device according to the present invention includes traveling state detecting means for detecting a traveling state of a mobile body, a waveform data table for storing one period of waveform data, reference signal generating means for generating a reference signal of a harmonic wave based on the traveling state by successively reading the waveform data from the waveform data table, acoustic control means for generating a control signal based on the reference signal, gain adjusting means for storing a gain table, which stores a gain for the control signal in association with the traveling state, reading the gain from the gain table depending on the traveling state, which is detected by the traveling state detecting means, and outputting the control signal, which is adjusted in gain using the gain, and sound effect output means for outputting a sound effect corresponding to the control signal which is adjusted in gain. The sound effect generating device may further comprise sound effect detecting means, disposed in an evaluating position near a passenger, for detecting the sound effect at the evaluating position, gain comparing means for storing a signal transfer characteristic from the sound effect output means to the sound effect detecting means, correcting a gain of the sound effect, which is detected by the sound effect detecting means, with the signal transfer characteristic in order to calculate a measured gain of the sound effect when the sound effect output means outputs the sound effect, and comparing the measured gain with the gain in the gain table, and gain correcting means for correcting the gain for the control signal, which is adjusted in gain, based on the result of the comparison from the gain comparing means.

According to the present invention, the gain for the control signal, which represents the sound effect, is corrected based on the result of the comparison between the gain for the control signal and the measured gain of the sound effect. Therefore, even if the measured gain of the sound effect varies due to aging of the sound effect output means, the output level of the sound effect output means is kept constant when the vehicle is in a prescribed traveling state, and hence aging of the sound effect output means can be compensated for. If the gain for the control signal and the signal transfer characteristic are shared by a plurality of sound effect generating devices, then it also is possible to compensate for performance variations of the sound effect generating devices.

According to the present invention, there also is provided a sound effect generating device for generating a sound effect as a pseudo operating sound of a drive source of a vehicle, comprising control signal generating means for generating a control signal representing the sound effect, sound effect output means for outputting the sound effect corresponding to the control signal, and sound effect detecting means for detecting the sound effect at an evaluating position. The control signal generating means sets a reference sound volume level as a reference value for a sound volume level of the sound effect when the vehicle is in a prescribed traveling state, compares a measured sound volume level of the sound effect, which is detected by the sound effect detecting means when the vehicle is in the prescribed traveling state, with the reference sound volume level, and corrects a gain of the control signal based on the result of the comparison.

According to the present invention, the gain for the control signal, which represents the sound effect, is corrected based on the result of the comparison between the reference sound volume level for the sound effect and the measured sound volume level of the sound effect. Therefore, even if the measured gain of the sound effect varies due to aging of the sound effect output means, the output level of the sound effect output means is kept constant when the vehicle is in a prescribed traveling state, and hence aging of the sound effect output means can be compensated for. If the reference sound volume level is shared by a plurality of sound effect generating devices, then it also is possible to compensate for performance variations of the sound effect generating devices.

DESCRIPTION OF EMBODIMENTS

[A. Embodiment]

1. Overall and Partial Configurations (1) Overall Configuration

Figure 1:
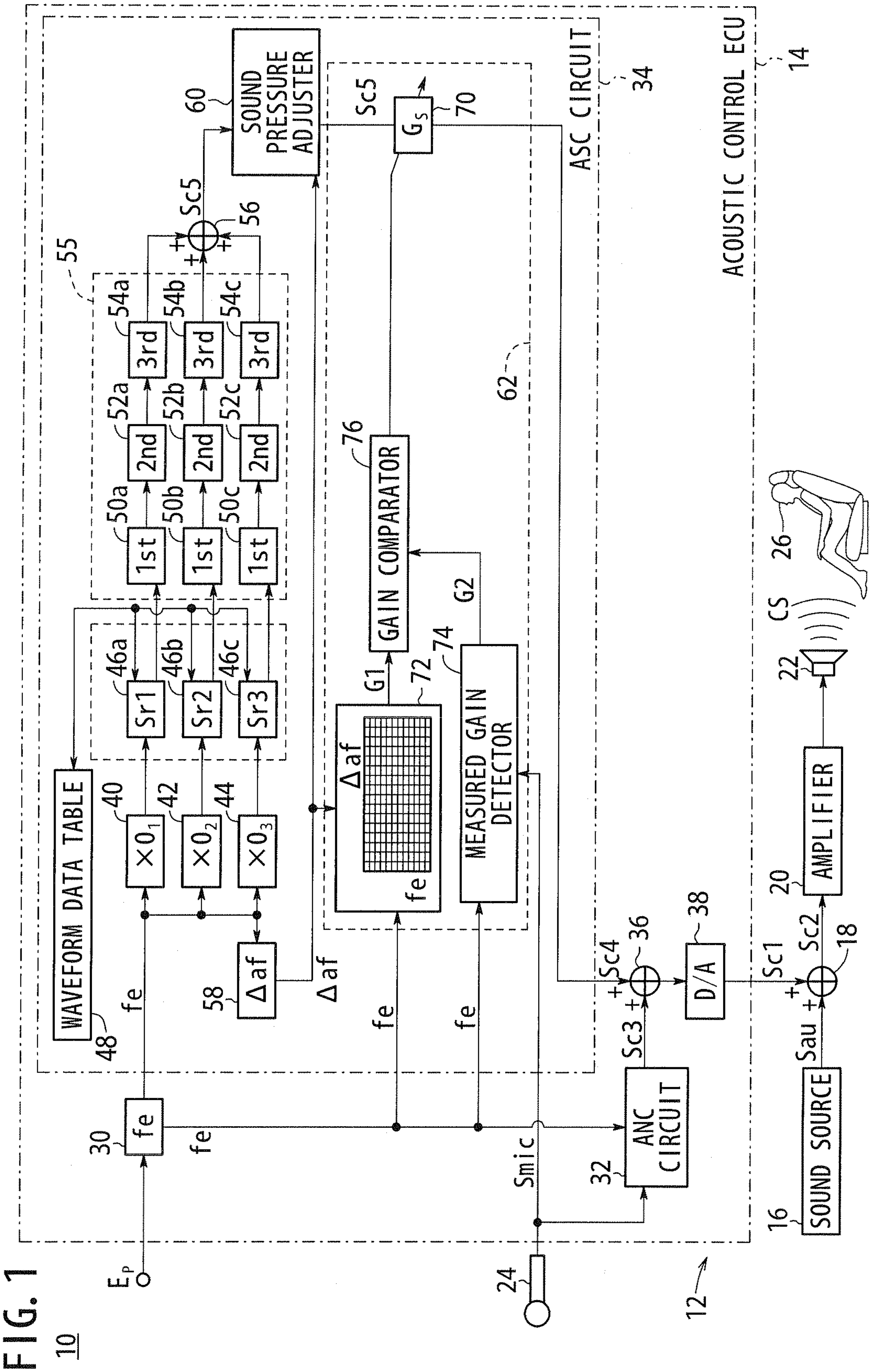
FIG. 1 is a schematic diagram of a vehicle incorporating a sound effect generating device therein according to an embodiment of the present invention.

FIG. 1 is a schematic diagram of a vehicle 10 incorporating an acoustic control ECU 14 (ECU: Electronic Control Unit), which functions as a sound effect generating device (ASC device) according to an embodiment of the present invention. The vehicle 10 is a gasoline-powered vehicle, although the vehicle 10 may be another vehicle such as an electric vehicle, a fuel cell vehicle, or the like.

The vehicle 10 has an acoustic system 12 including, in addition to the acoustic control ECU 14, a sound source 16, an adder 18, an amplifier 20, a speaker 22, and a microphone 24.

The acoustic control ECU 14 (hereinafter referred to as an "ECU 14") functions both as an active noise control device (hereinafter referred to as an "ANC device") and as an ASC device. When the ECU 14 functions as an ANC device, a control signal Sc1 output from the ECU 14 represents a cancellation sound for canceling noise (muffled engine sound) generated in the passenger compartment by operation (vibration) of the engine, and noise (road noise), etc., generated in the passenger compartment by contact between the wheels and the road while the vehicle 10 is traveling. When the ECU 14 functions as an ASC device, a control signal Sc1 represents a sound effect (pseudo-engine sound) that is synchronous with the muffled engine sound.

The sound source 16, which includes an audio system and a navigation system, outputs to the adder 18 an audio signal Sau that defines music sounds and voices for route guidance.

The adder 18 combines the control signal Sc1 from the ECU 14 and the audio signal Sau from the sound source 16 into a control signal Sc2, which is output via the amplifier 20 to the speaker 22.

The speaker 22 outputs a control sound CS toward a passenger 26, which is defined by the control signal Sc2 from the adder 18. Therefore, when the ECU 14 functions as an ANC device, the speaker 22 outputs the control sound CS as a cancellation sound for canceling the muffled engine sound, and when the ECU 14 functions as an ASC device, the speaker 22 outputs the control sound CS as a sound effect (pseudo-engine sound).

The microphone 24, which is disposed at a position (evaluation position) near an ear of the passenger 26, detects sounds at the position. The microphone 24 then generates an electric signal (microphone signal Smic) depending on the detected sound, and outputs the microphone signal Smic to the ECU 14. When the ECU 14 functions as an ANC device, the sound detected by the microphone 24 represents residual noise, which remains after the cancellation sound has canceled the passenger compartment sound such as the muffled engine sound, etc. In this case, the microphone signal Smic is an error signal representative of residual noise. When the ECU 14 functions as an ASC device, the sound detected by the microphone 24 is a sound representative of a combination of passenger compartment sounds, such as the muffled engine sound, etc., and the sound effect (pseudo-engine sound). According to the present embodiment, the gain (amplitude) of the control signal Sc1 is corrected using the microphone signal Smic at the time that the ECU 14 functions as an ASC device, as described in detail later.

(2) Acoustic Control ECU 14

(i) Overall Configuration

The ECU 14 includes an engine rotational frequency detector 30 (hereinafter referred to as an "fe detector 30"), an ANC circuit 32, an ASC circuit 34, an adder 36, and a digital-to-analog converter 38 (hereinafter referred to as an "A/D converter 38").

The fe detector 30 detects an engine rotational frequency fe [Hz] based on engine pulses Ep from a fuel injection control device, hereinafter referred to as an "FI ECU" (FI ECU: Fuel Injection Electronic Control Unit), not shown, which controls fuel injection of an engine, not shown. The fe detector 30 outputs the detected engine rotational frequency fe to the ANC circuit 32 and the ASC circuit 34.

The ANC circuit 32 generates cancellation sounds for canceling noise, such as a muffled engine sound and road noise, in order to reduce the noise. The ANC circuit 32 may be the circuit disclosed in U.S. Patent Application Publication No. 2004/0247137 or U.S. Pat. No. 7,062,049.

The ASC circuit 34 generates a sound effect as a pseudo-engine sound, in order to enhance an acoustic effect in the passenger compartment, e.g., to emphasize a change in the speed of the vehicle.

As shown in FIG. 1, the adder 36 generates the control signal Sc1 by combining an output signal (control signal Sc3) from the ANC circuit 32 and an output signal (control signal Sc4) from the ASC circuit 34. The control signal Sc1 is converted from a digital signal into an analog signal by the D/A converter 38. The digital control signal Sc1 is output to the adder 18.

(ii) Details of the ASC Circuit 34

As shown in FIG. 1, the ASC circuit 34 includes multipliers 40, 42, 44, reference signal generators 46*a*, 46*b*, 46*c*, a waveform data table 48, an acoustic correcting means 55 having first acoustic correctors 50*a*, 50*b*, 50*c*, second acoustic correctors 52*a*, 52*b*, 52*c*, and third acoustic correctors 54*a*, 54*b*, 54*c*, an adder 56, a frequency change detector 58 (hereinafter referred to as a "Δaf detector 58"), a sound pressure adjuster 60, and a sound volume level corrector 62. Such components, except for the sound volume level corrector 62, may be the components disclosed in U.S. Patent Application Publication No. 2006/0215846 and U.S. Patent Application Publication No. 2009/0028353 (see FIG. 1 of U.S. Patent Application Publication No. 2006/0215846 and FIG. 1 of U.S. Patent Application Publication No. 2009/0028353).

The multipliers 40, 42, 44 generate respective harmonic signals having frequencies of certain orders (certain multiples) of the engine rotational frequency fe. More specifically, the multiplier 40 generates an $O_1$-th order (e.g., second order) harmonic signal, the multiplier 42 generates an $O_2$-th order (e.g., third order) harmonic signal, and the multiplier 44 generates an $O_3$-th order (e.g., fourth order) harmonic signal.

The reference signal generators 46*a* through 46*c* generate respective reference signals Sr1, Sr2, Sr3 using the harmonic signals from the multipliers 40, 42, 44 and waveform data, which is stored in the waveform data table 48, and outputs the generated reference signals Sr1, Sr2, Sr3 to the first acoustic correctors 50*a* through 50*c*.

The first acoustic correctors 50*a* through 50*c* perform a flattening process on the respective reference signals Sr1 through Sr3 in order to generate a control sound CS as a sound effect, which is linearly responsive to an accelerating action at the ear of the passenger 26 (see paragraphs [0069] through [0076] of U.S. Patent Application Publication No. 2006/0215846). The second acoustic correctors 52*a* through 52*c* perform a frequency emphasizing process on the respective reference signals Sr1 through Sr3 in order to emphasize only a desired frequency of the control sound CS as a sound effect (see paragraphs [0079] through [0082] of U.S. Patent Application Publication No. 2006/0215846). The third acoustic correctors 54*a* through 54*c* perform an order-dependent correcting process, so as to correct the respective reference signals Sr1 through Sr3 depending on the order (see paragraph [0088] of U.S. Patent Application Publication No. 2006/0215846). The reference signals Sr1 through Sr3, which have been processed by the first acoustic correctors 50*a* through 50*c*, the second acoustic correctors 52*a* through 52*c*, and the third acoustic correctors 54*a* through 54*c*, are combined into a control signal Sc5 by the adder 56.

The Δaf detector 58 detects a change per unit time in the engine rotational frequency fe (hereinafter referred to as a "frequency change Δaf") [Hz/s] based on the engine rotational frequency fe from the fe detector 30, and outputs the detected frequency change Δaf to the sound pressure adjuster 60 and the sound volume level corrector 62.

The sound pressure adjuster 60 stores in advance a gain table defining a relationship between frequency changes Δaf and weighting gains, sets a gain for the control signal Sc5 from the adder 56 depending on the frequency change Δaf, and adjusts the volume level of a sound effect, as shown in FIG. 14 of U.S. Patent Application Publication No. 2006/0215846.

The sound volume level corrector 62 performs a process (sound volume level stabilizing process) for adjusting the gain of the control signal Sc5 in order to compensate for performance variations and aging of the individual unit of the speaker 22, which serves as a sound effect output means.

(iii) Details of the Sound Volume Level Corrector 62

The sound volume level corrector 62 includes a gain corrector 70, a reference table 72, a measured gain detector 74, and a gain comparator 76.

The gain corrector 70 multiplies the control signal Sc5, which is supplied from the adder 56 via the sound pressure adjuster 60, by a sound volume level stabilizing coefficient Gs. The sound volume level stabilizing coefficient Gs (hereinafter referred to as a "coefficient Gs") is a coefficient for compensating for performance variations and aging of the individual unit of the speaker 22. The coefficient Gs is used to keep the sound volume level (amplitude) of the control sound CS (sound effect), which is output from the speaker 22 when the vehicle 10 is in a prescribed traveling state, at a constant level. In the present embodiment, the prescribed traveling state refers to a state in which the engine rotational frequency fe and the frequency change Δaf are of predetermined values. A process for setting the coefficient Gs will be described later.

The reference table 72 stores predicted gains G1 as predicted values (reference values) for the gain (amplitude) of a prescribed component of the control sound CS (sound effect), which is detected by the microphone 24. The reference table 72 identifies a predicted gain G1 depending on a combination of the engine rotational frequency fe and the frequency change Δaf, and outputs the identified predicted gain G1 to the gain comparator 76. The reference table 72 may also multiply the predicted gain G1 by the amplification factor of the amplifier 20. The prescribed component referred to above is a component of one of the certain orders of the engine rotational frequency fe generated from the multipliers 40, 42, 44, etc. In the present embodiment, the prescribed component is a component of the $O_1$-th order of the engine rotational frequency fe. Alternatively, the prescribed component may be a component of the $O_2$-th order or the $O_3$-th order of the engine rotational frequency fe.

Since the handled orders are preset as described above, and since the signal transfer function from the speaker 22 to the microphone 24 can be identified beforehand, the predicted gain G1 can be identified assuming that the engine rotational frequency fe and the frequency change Δaf are known. For example, if the reference signal Sr1 generated by the reference signal generator 46*a l has a gain (amplitude) of* 1, and the sound volume level corrector 62 does not perform a sound volume level stabilizing process, then the gain of the $O_1$-th order component of the control signal Sc5 output from the sound pressure adjuster 60, which reflects the signal transfer function, is used as a predicted gain G1 (more specifically, the predicted gain G1 can be identified more accurately by reflecting therein the amplification factor of the amplifier 20).

However, inasmuch as a measured gain G2, which is detected by the measured gain detector 74, is calculated as the squared value of an actual gain (as described later), the predicted gains G1 used in the present embodiment are stored as squared values of gains as predicted values (reference values). In the present embodiment, in order to compare the predicted gain G1 at the microphone 24 and the measured gain G2 with each other (i.e., to match the evaluating positions thereof), the predicted gain G1 is of a value in which the signal transfer function from the speaker 22 to the microphone 24 is reflected in advance, as described above.

The measured gain detector 74 detects a measured gain G2 as a measured value of the gain (amplitude) of the prescribed component ($O_1$-th order component) of the control sound CS (sound effect), which is detected by the microphone 24.

Figure 2:
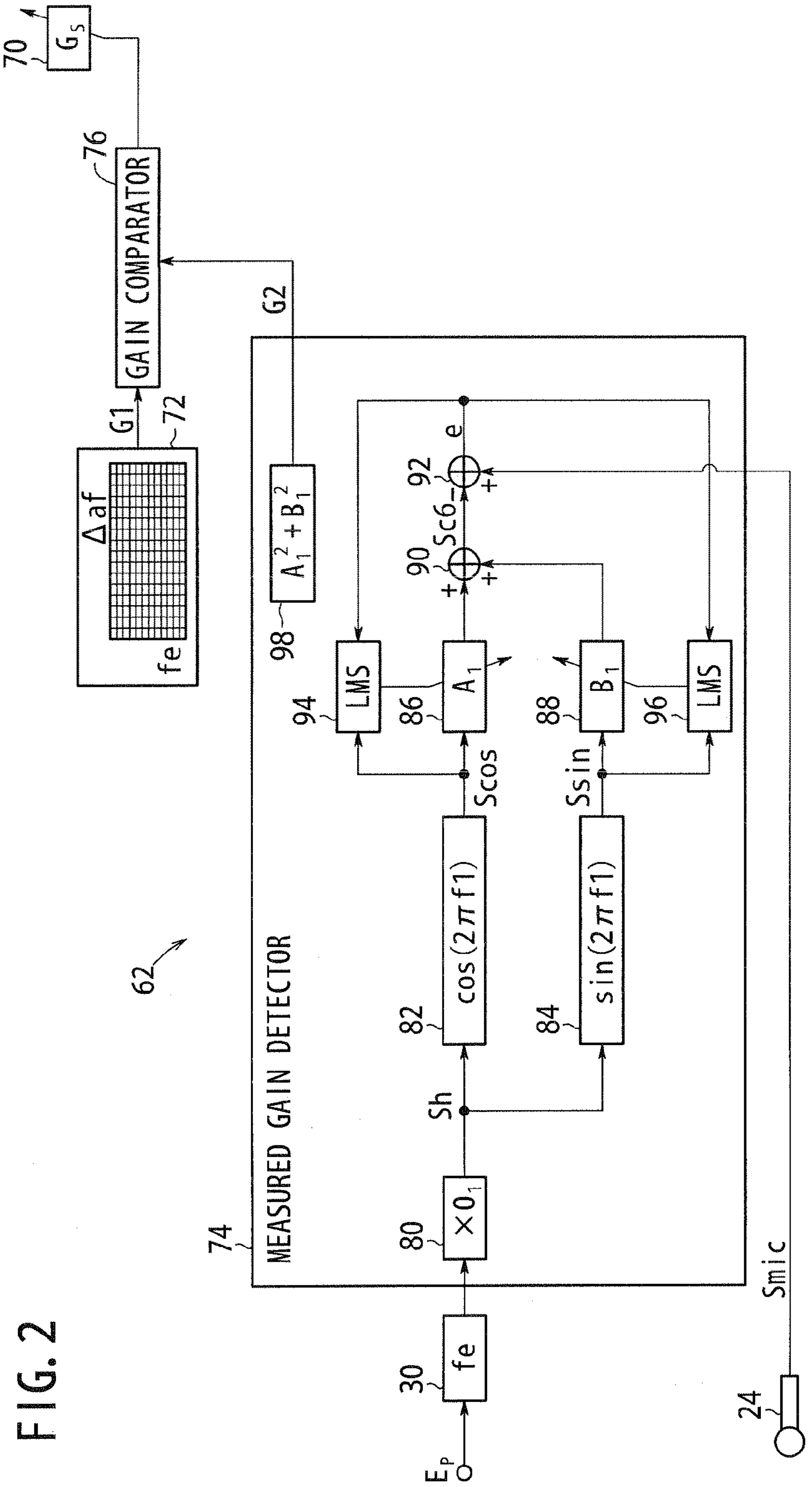
FIG. 2 is a diagram showing a configuration of a measured gain detector of the sound effect generating device.

FIG. 2 is a block diagram showing details of the measured gain detector 74. As shown in FIG. 2, the measured gain detector 74 includes a multiplier 80, a cosine wave generator 82, a sine wave generator 84, a first adaptive filter 86, a second adaptive filter 88, an adder 90, a subtractor 92, a first filter coefficient updater 94, a second filter coefficient updater 96, and a measured gain calculator 98.

The multiplier 80, which is identical to the multiplier 40, generates a harmonic signal Sh of a particular order ($O_1$-th order in the present embodiment) for the predicted gain G1. Stated otherwise, the frequency f1 of the harmonic signal Sh is the same as the frequency of the harmonic signal that is output from the multiplier 40.

The cosine wave generator 82 generates a cosine wave signal Scos having a frequency f1 and a gain (amplitude) 1, and outputs the generated cosine wave signal Scos to the first adaptive filter 86 and the first filter coefficient updater 94. The cosine wave signal Scos is defined by cos(2πf1). The sine wave generator 84 generates a sine wave signal Ssin having a frequency f1 and a gain (amplitude) 1, and outputs the generated sine wave signal Ssin to the second adaptive filter 88 and the second filter coefficient updater 96. The sine wave signal Ssin is defined by sin(2πf1).

The first adaptive filter 86 multiplies the cosine wave signal Scos by a filter coefficient $A_1$ and outputs the multiplied signal to the adder 90. The filter coefficient $A_1$ is updated as needed by the first filter coefficient updater 94. The second adaptive filter 88 multiplies the sine wave signal Ssin by a filter coefficient $B_1$ and outputs the multiplied signal to the adder 90. The filter coefficient $B_1$ is updated as needed by the second filter coefficient updater 96.

The adder 90 adds the cosine wave signal Scos output from the first adaptive filter 86 and the sine wave signal Ssin output from the second adaptive filter 88 in order to generate a control signal Sc6, and outputs the control signal Sc6 to the subtractor 92. The control signal Sc6 represents only the extracted $O_1$-th order component.

The subtractor 92 generates an error signal e representing a difference between the microphone signal Smic from the microphone 24 and the control signal Sc6 from the adder 90, and outputs the generated error signal e to the first filter coefficient updater 94 and the second filter coefficient updater 96.

The first filter coefficient updater 94 sequentially calculates and updates a filter coefficient $A_1$ of the first adaptive filter 86. The first filter coefficient updater 94 calculates the filter coefficient $A_1$ according to an adaptive algorithm (e.g., a least-mean-square (LMS) algorithm). In particular, the first filter coefficient updater 94 calculates the filter coefficient $A_1$ so as to make the square $e^2$ of the error signal e nil, based on the cosine wave signal Scos from the cosine wave generator 82 and the error signal e from the subtractor 92. More specifically, the first filter coefficient updater 94 calculates the filter coefficient $A_1$ according to the following equation (1):

$$A_1(n+1)=A_1(n)-\mu\{e(n)\times S\cos(n)+S\cos(n)\} \quad (1)$$

where μ represents a step size parameter. As can be seen from equation (1), by adjusting the step size parameter μ, it is possible to adjust a convergence time until the square $e^2$ of the error signal e becomes minimum.

The second filter coefficient updater 96 sequentially calculates and updates a filter coefficient $B_1$ of the second adaptive filter 88. The second filter coefficient updater 96 calculates the filter coefficient $B_1$ according to an adaptive algorithm, e.g., a least-mean-square (LMS) algorithm. The filter coefficient $B_1$ is calculated in the same manner as the filter coefficient $A_1$.

The measured gain calculator 98 calculates a measured gain G2 based on the filter coefficients $A_1$, $B_1$, and outputs the measured gain G2 to the gain comparator 76. More specifically, the measured gain calculator 98 calculates as a measured gain G2 the sum $A_1^2+B_1^2$ of the square of the filter coefficient $A_1$ and the square of the filter coefficient $A_1$. The sum $A_1^2+B_1^2$ represents the squared value of the amplitude of the component of a certain order ($O_1$ in the present embodiment) included in the microphone signal Smic. The value of the measured gain G2, which is output from the measured gain calculator 98 to the gain comparator 76, may be a moving average of the latest ten values, for example.

The gain comparator 76 compares the predicted gain G1 read from the reference table 72 and the measured gain G2 output from the measured gain calculator 98, and adjusts the sound volume level stabilizing coefficient Gs of the gain corrector 70 depending on the measurement result. More specifically, if the predicted gain G1 is greater than the measured gain G2, then the control sound CS (sound effect) output from the speaker 22 falls short of the required sound volume level (amplitude). Therefore, the gain comparator 76 increases the sound volume level stabilizing coefficient Gs in order to increase the sound volume level (amplitude) of the control sound CS. Conversely, if the predicted gain G1 is smaller than the measured gain G2, then the control sound CS (sound effect) output from the speaker 22 is greater than the required sound volume level (amplitude). Therefore, the gain comparator 76 reduces the sound volume level stabilizing coefficient Gs in order to reduce the sound volume level (amplitude) of the control sound CS. According to this process, it is possible to prevent changes in the association between the gain (amplitude) of the control signal Sc5 after the sound pressure thereof has been adjusted by the sound pressure adjuster 60, and the gain (amplitude) of the control sound CS (sound effect) output from the speaker 22.

2. Processing Sequence of the Sound Volume Level Corrector 62

A processing sequence of the sound volume level corrector 62 will be described below.

Figure 3:
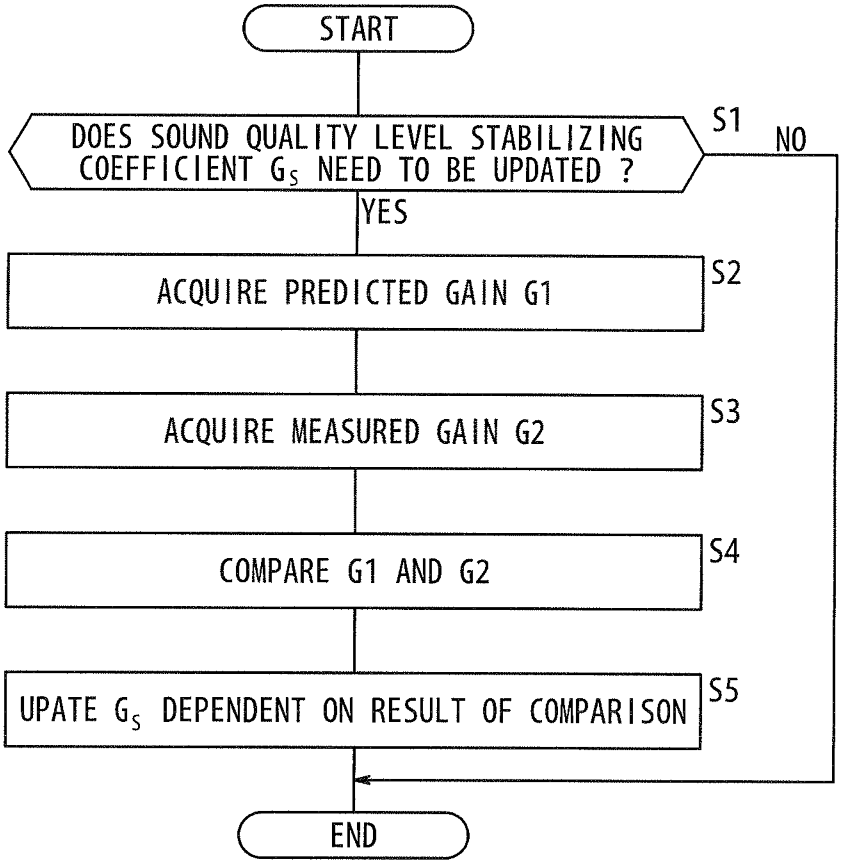
FIG. 3 is a flowchart of an operation sequence of the sound effect generating device for updating a sound volume level stabilizing coefficient.

FIG. 3 is a flowchart of a processing sequence of the sound volume level corrector 62, which updates the sound volume level stabilizing coefficient Gs.

In step S1, the sound volume level corrector 62 determines whether or not the sound volume level stabilizing coefficient Gs needs to be updated. More specifically, the sound volume level corrector 62 sets in advance a plurality of values (updating execution values Vu) of the engine rotational speed NE (rpm) (with is synonymous with the engine rotational frequency fe), in order to determine whether or not the sound volume level stabilizing coefficient Gs needs to be updated, and determines whether or not the present engine rotational speed NE is equivalent to one of the updating execution values Vu.

Figure 4:
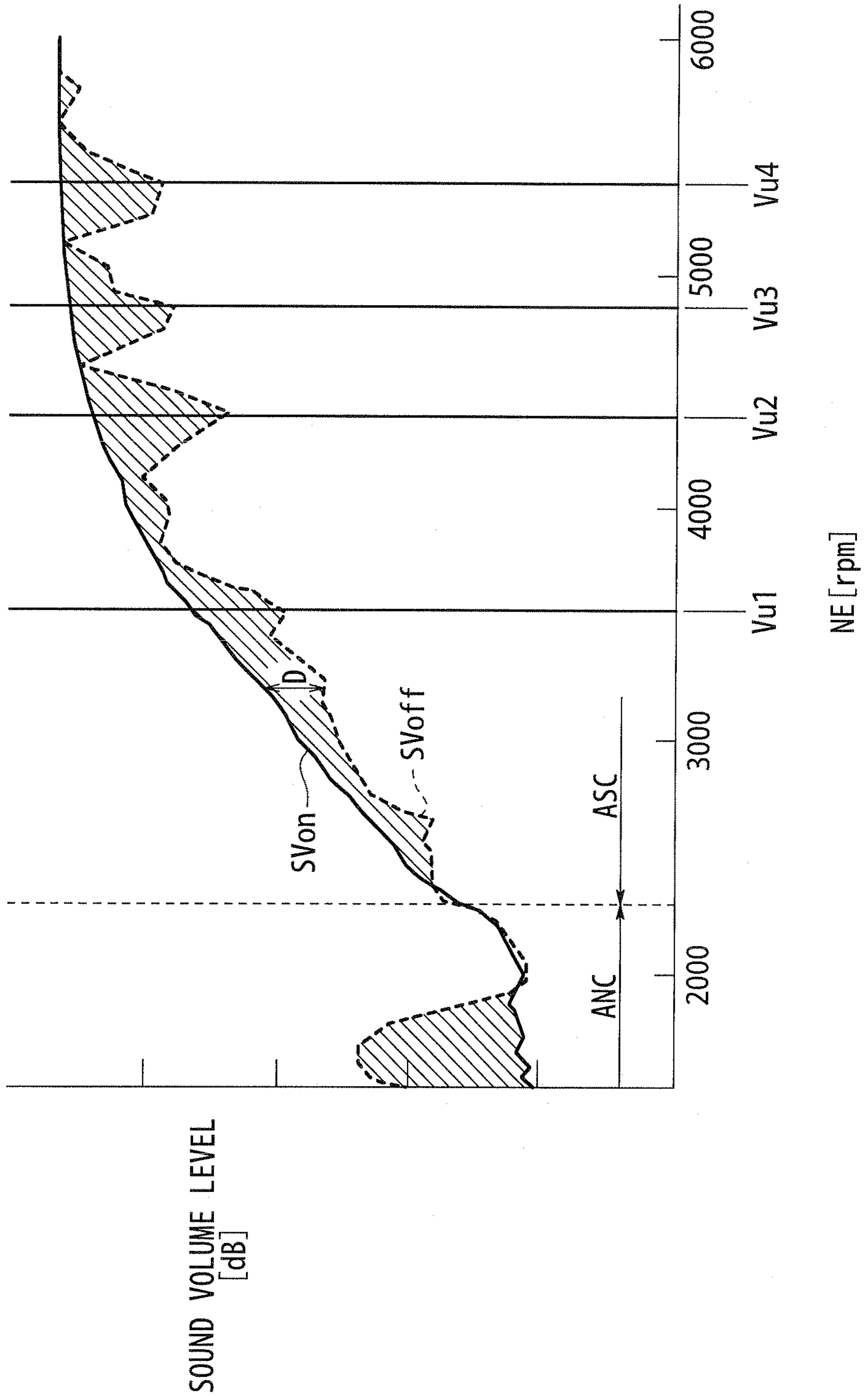
FIG 4 is a diagram showing an example of a relationship between the sound volume level of the sound in a passenger compartment during operation of an acoustic control ECU, the sound volume level of sound in the passenger compartment when the acoustic control ECU is not in operation, and updating of execution values for updating the sound volume level stabilizing coefficient.

FIG. 4 shows an example of the relationship between the sound volume level of the sound in the passenger compartment when the ECU 14 is in operation, the sound volume level of the sound in the passenger compartment when the ECU 14 is not in operation, and the updating execution values Vu. In FIG. 4, updating execution values Vu1 through Vu4 are illustrated as a plurality of updating execution values Vu.

As shown in FIG. 4, switching between respective operations of the ANC circuit 32 and the ASC circuit 34 is performed depending on the engine rotational speed NE (rpm). More specifically, if the engine rotational speed NE is equal to or less than 2200 rpm, then the ANC circuit 32 is operated, whereas if the engine rotational speed NE is greater than 2200 rpm, then the ASC circuit 34 is operated.

In FIG. 4, the solid-line curve indicates a sound volume level SVon [dB] of the sound in the passenger compartment during times that the ANC circuit 32 or the ASC circuit 34 is in operation. The sound in the passenger compartment is a combination of the muffled engine sound (actual engine sound) and the control sound CS (cancellation sound or sound effect). In FIG. 4, the broken-line curve indicates a sound volume level SVoff [dB] of the sound in the passenger compartment during times that the ANC circuit 32 and the ASC circuit 34 are not in operation. Each of the sound volume levels SVon, SVoff is detected as an amplitude of the microphone signal Smic, which is detected by the microphone 24. The example shown in FIG. 4 shows a waveform at a time when the vehicle 10 is accelerated (that is, a waveform when the engine rotational speed NE is increasing).

As can be understood from FIG. 4, within the operating range of the ASC circuit 34 (i.e., a range in which the engine rotational speed NE is higher than 2200 rpm), the difference D between the sound volume level SVon and the sound volume level SVoff is not constant, but differs depending on the engine rotational speed NE. For example, the difference D is relatively large when the engine rotational speed NE is about 3550 rpm, 4380 rpm, 4850 rpm, and 5380 rpm. According to the present embodiment, these values of the engine rotational speed NE are set as the updating execution values Vu1 through Vu4. The sound volume level stabilizing coefficient Gs can thus be updated accurately. More specifically, at an engine rotational speed NE in which the difference D is relatively large, the proportion of the control sound CS (sound effect) in the sound detected by the microphone 24 is large, whereas the proportion of the muffled engine sound is small. Therefore, it is easy to detect the sound volume level SVon of the control sound CS, thereby enabling the sound volume level stabilizing coefficient Gs to be detected accurately depending on the sound volume level SVon.

Referring back to FIG. 3, if the engine rotational speed NE is none of the updating execution values Vu1 through Vu4 and if the sound volume level stabilizing coefficient Gs is not updated (step S1: NO), then the present cycle of the processing sequence is ended. If the engine rotational speed NE is equivalent to the updating execution value Vu and if the sound volume level stabilizing coefficient Gs is to be updated (step S1: YES), then control proceeds to step S2.

In step S2, the sound volume level corrector 62 acquires a predicted gain G1. More specifically, the sound volume level corrector 62 reads a predicted gain G1 from the reference table 72, based on the engine rotational frequency fe from the fe detector 30 and the rotational frequency change Δaf from the Δaf detector 58, and outputs the read predicted gain G1 to the gain comparator 76. The predicted gain G1 should preferably reflect the amplification factor of the amplifier 20. As described above, the predicted gain G1 in the present embodiment reflects the signal transfer function from the speaker 22 to the microphone 24.

In step S3, the sound volume level corrector 62 acquires a measured gain G2. More specifically, the sound volume level corrector 62 extracts an $O_1$-th order component from the microphone signal Smic from the microphone 24, and calculates the squared value ($A_1^2+B_1^2$) of the gain of the $O_1$-th order component. The sound volume level corrector 62 then outputs the calculated squared value as a measured gain G2 to the gain comparator 76.

In step S4, the gain comparator 76 of the sound volume level corrector 62 compares the predicted gain G1 acquired in step S2 and the measured gain G2 acquired in step S3.

In step S5, the gain comparator 76 updates the sound volume level stabilizing coefficient Gs depending on the comparison result in step S4. More specifically, if the predicted gain G1 is greater than the measured gain G2, then the gain comparator 76 increases the sound volume level stabilizing coefficient Gs, whereas if the predicted gain G1 is less than the measured gain G2, then the gain comparator 76 reduces the sound volume level stabilizing coefficient Gs. If the predicted gain G1 is equal to the measured gain G2, then the gain comparator 76 maintains the sound volume level stabilizing coefficient Gs at its present value. The sound volume level stabilizing coefficient Gs has an initial value (multiplier) of 1.

3. Advantages of the Present Embodiment

According to the present embodiment, as described above, the gain of the control signal Cs5, which represents the sound effect, is corrected based on the result of the comparison between the predicted gain G1 of the sound effect based on the engine rotational frequency fe and the frequency change Δaf, and the measured gain G2 of the sound effect. Therefore, even if the measured gain G2 of the sound effect varies due to aging of the speaker 22, the output level of the speaker 22 is kept constant during times that the vehicle 10 is in a prescribed traveling state, and hence aging of the speaker 22 can be compensated for. If predicted gains G1 (or the reference table 72) are shared by a plurality of vehicles 10 (ECUs 14), then it is also possible to compensate for performance variations of the speakers 22.

According to the present embodiment, a predicted gain g1 of a certain order ($O_1$-th order in the present embodiment) is identified based on the reference table 72, and a measured gain G2 of the certain order is detected from the sound effect at the evaluating position. Therefore, it is possible to identify the predicted gain G1 and the measured gain G2 based only on the certain order, and hence to identify the predicted gain G1 and the measured gain G2 with higher accuracy than if the order were not identified.

According to the present embodiment, the gain comparator 76 compares the predicted gain G1 and the measured gain G2 with each other, at any one of the frequencies (updating execution values Vu1 through Vu4), for thereby relatively increasing the gain of the control sound CS with the acoustic correcting means 55, from among the control frequencies for the control sound CS (control signal Cs5). The gain corrector 70 corrects the gain of the control sound CS with any one of the updating execution values Vu1 through Vu4. In this fashion, the measured gain G2 can be identified accurately.

[B. Applications of the Invention]

The present invention is not limited to the above embodiment, but may employ various arrangements based on the content of the present description. For example, the present invention may employ the arrangements described below.

In the above embodiment, the vehicle 10 is a gasoline-powered vehicle, and the control sound CS, which is a sound effect output from the speaker 22, is a pseudo-engine sound. However, the control sound CS is not limited to being a pseudo-engine sound, but may also be a pseudo-operational sound of a drive source. For example, if the vehicle 10 is an electric vehicle, then the control sound CS may be a pseudo-operational sound of a traction motor. Further, if the vehicle 10 is a fuel cell vehicle, then the control sound CS may be a pseudo-operational sound of an air compressor.

In the above embodiment, the predicted gain G1 is set depending on a combination of the engine rotational frequency fe and the frequency change Δaf. However, the predicted gain G1 may be set based on either one of the engine rotational frequency fe and the frequency change Δaf. Alternatively, the predicted gain G1 may be set based on either one or both of a vehicle speed V [km/h] of the vehicle 10 and a vehicle speed change Δav [km/h/s]. In particular, if vehicle speed V is used to adjust a reference signal or a control signal according to the arrangement disclosed in U.S. Patent Application Publication No. 2009/0028353 (FIG. 1 thereof), then it is preferable to use at least one of the vehicle speed V and the vehicle speed change Δav.

Alternatively, if the vehicle 10 is an electric vehicle, then the predicted gain G1 may be set based on either one or both of a rotational frequency [Hz] of the traction motor and a rotational frequency change [Hz/s] of the traction motor.

Figure 5:
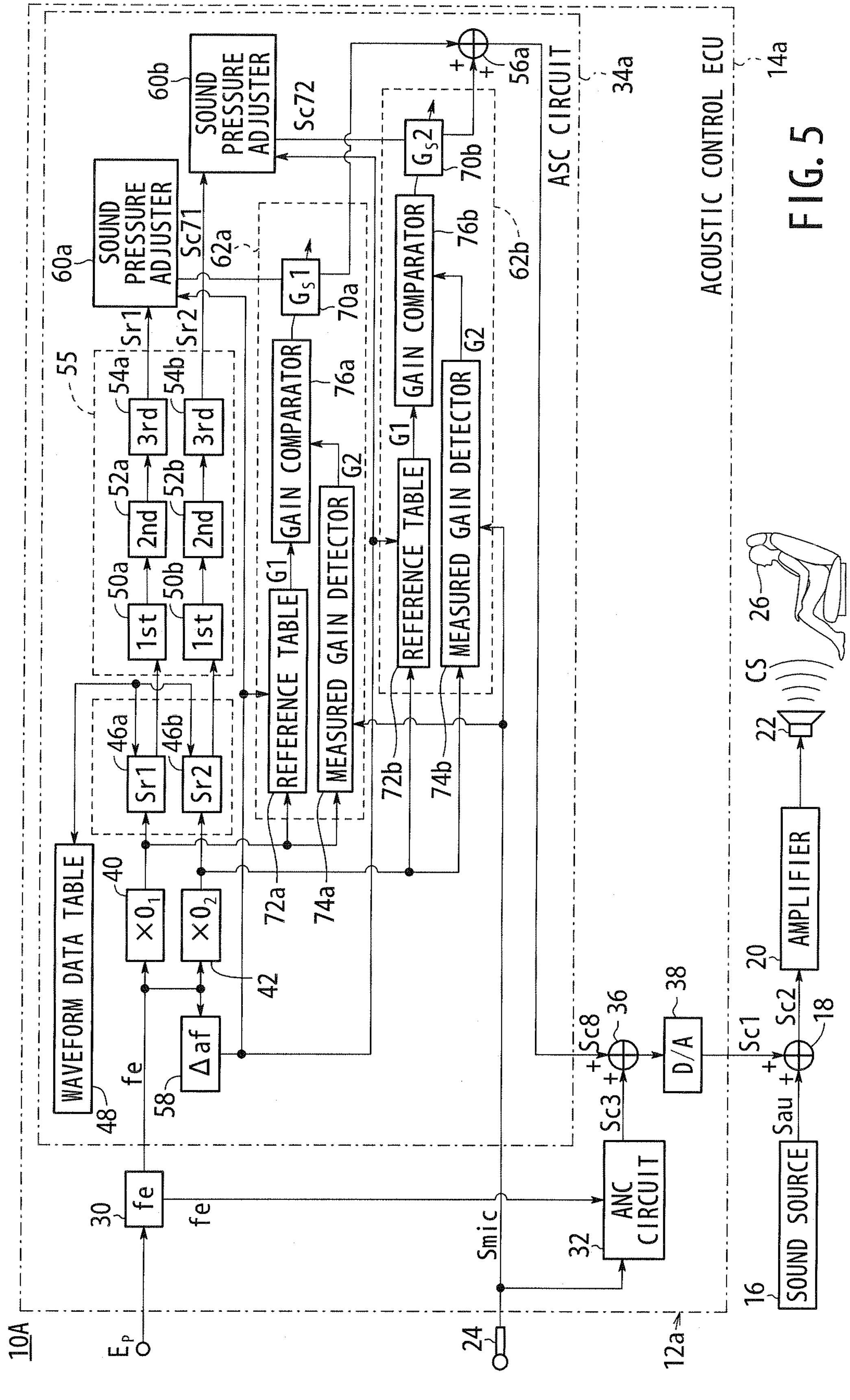
FIG. 5 is a schematic diagram of a vehicle, which incorporates therein a modification of the sound effect generating device.

In the above embodiment, the reference signals Sr1 through Sr3 are combined, and the sound volume level corrector 62 performs a sound volume level stabilizing process on the control signal Sc5 after the sound pressure thereof has been adjusted by the sound pressure adjuster 60. However, as shown in FIG. 5, as performed by the ASC circuit 34*a* of the acoustic control ECU 14*a* in an acoustic system 12*a* of a vehicle 10A, control signals Sc71, Sc72 of respective order components may be combined after respective sound pressure adjusting processes have been carried out by the sound pressure adjusters 60*a*, 60*b*, and after respective sound volume level stabilizing processes have been carried out by the sound volume level correctors 62*a*, 62*b*.

More specifically, the ASC circuit 34*a* includes the sound pressure adjusters 60*a*, 60*b* and the sound volume level correctors 62*a*, 62*b*. The sound pressure adjuster 60*a* performs a sound pressure adjusting process on the reference signal Sr1, which is output from the reference signal generator 46*a* and acoustically corrected by the acoustic correcting means 55, and outputs the control signal Sc71. Similarly, the sound pressure adjuster 60*b* performs a sound pressure adjusting process on the reference signal Sr2, which is output from the reference signal generator 46*b* and acoustically corrected by the acoustic correcting means 55, and outputs the control signal Sc72.

The sound volume level corrector 62*a* includes a gain corrector 70*a*, a reference table 72*a*, a measured gain detector 74*a*, and a gain comparator 76*a*. Similarly, the sound volume level corrector 62*b* includes a gain corrector 70*b*, a reference table 72*b*, a measured gain detector 74*b*, and a gain comparator 76*b*. Although the sound volume level correctors 62*a*, 62*b* are basically of the same configuration as the sound volume level corrector 62, the measured gain detectors 74*a*, 74*b* are supplied with harmonic signals from the multipliers 40, 42, and therefore the measured gain detectors 74*a*, 74*b* do not generate harmonic signals by themselves. The sound volume level corrector 62*a* performs a sound volume level stabilizing process on the control signal Sc71 output from the sound pressure adjuster 60*a*, and the sound volume level corrector 62*b* performs a sound volume level stabilizing process on the control signal Sc72 output from the sound pressure adjuster 60*b*. Accordingly, it is possible to correct the sound volume level stabilizing coefficients Gs1, Gs2 depending on the orders.

The control signals Sc71, Sc72, on which the sound volume level stabilizing processes have been performed by the sound volume level correctors 62*a*, 62*b*, are added by an adder 56*a* into a control signal Sc8, which is output to the adder 36.

In the above embodiment, a time shift (phase difference) that the control sound CS undergoes upon traveling from the speaker 22 to the microphone 24 is compensated for by reflecting in the predicted gain G1 the signal transfer function from the speaker 22 to the microphone 24. Stated otherwise, the predicted gain G1 and the measured gain G2 at the time that the microphone 24 detects the control sound CS are compared with each other. However, the present invention is not limited to such a process of compensating for time shift. The signal transfer function may be acquired in advance, and may be reflected in the measured gain G2. Stated otherwise, the predicted gain G1 and the measured gain G2 at the time that the speaker 22 outputs the control sound CS may be compared with each other. Alternatively, the predicted gain G1 and the measured gain G2 at a certain evaluating position between the speaker 22 and the microphone 24 may be compared with each other. In this case, the predicted gain G1, which is corrected by a signal transfer function from the speaker 22 to the evaluating position, and the measured gain G2, which is corrected by a signal transfer function from the evaluating position to the microphone, are compared with each other.

The invention claimed is:

1. A sound effect generating device including:

traveling state detecting means for detecting a traveling state of a mobile body;

a waveform data table for storing one period of waveform data;

reference signal generating means for generating a reference signal of a certain order by successively reading the waveform data from the waveform data table based on the traveling state;

acoustic control means for generating a control signal based on the reference signal;

gain adjusting means for storing a first gain table, which stores a gain for the control signal in association with the traveling state, reading the gain from the first gain table depending on the traveling state, which is detected by the traveling state detecting means, and outputting the control signal, which is adjusted in gain using the gain; and sound effect output means for outputting a sound effect corresponding to the control signal, which is adjusted in gain, wherein the sound effect generating device further comprises:

sound effect detecting means, disposed in an evaluating position near a passenger for detecting the sound effect at the evaluating position;

gain comparing means for storing a second gain table, which stores a predicted gain for the control signal at the evaluating position, the predicted gain representing the gain for the control signal in the first gain table as reflecting a signal transfer characteristic from the sound effect output means to the sound effect detecting means, and comparing the predicted gain and a measured gain of the sound effect, which is detected by the sound effect detecting means; and gain correcting means for correcting the gain for the control signal, which is adjusted in gain, based on the result of the comparison from the gain comparing means, wherein the gain comparing means compares the predicted gain and the measured gain. with each other at a specified, frequency where a difference sound volume level of a sound between when the sound effect generating device is in operation and when the sound effect generating device is not in operation shows a local maximal value, from among control frequencies for the control signal; or the gain correcting means corrects the gain for the control signal at the specified frequency.

2. A sound effect generating device including:

traveling state detecting means for detecting a traveling state of a mobile body;

a waveform data table for storing one period of waveform data;

reference signal generating means for generating a reference signal of a certain order by successively reading the waveform data from the waveform data table based on the traveling state;

acoustic control means for generating a control signal based on the reference signal;

gain adjusting means for storing a first gain table, which stores a gain for the control signal in association with the traveling state, reading the gain from the first gain table depending on the traveling state, which is detected by the traveling state detecting means, and outputting the control signal, which is adjusted in gain using the gain; and sound effect output means fur outputting a sound effect corresponding to the control signal, which is adjusted in gain, wherein the sound effect generating device further comprises:

sound effect detecting means, disposed in an evaluating position near a passenger, for detecting the sound effect at the evaluating position;

gain comparing means for storing a second gain table, which stores a predicted gain for the control signal at the evaluating position, the predicted gain representing the gain for the control signal in the first gain table as reflecting a signal transfer characteristic from the sound effect output means to the sound effect detecting means, and comparing the predicted gain and a measured gain of the sound effect, which is detected by the sound effect detecting means; and gain correcting means for correcting the gain for the control signal, which is adjusted in gain, based on the result of the comparison from the gain comparing means, wherein the gain comparing means comprises:

predicted gain identifying means for identifying a predicted gain of the certain order based on the second gain table; and measured gain detecting means for detecting a measured gain of the certain order from the sound effect at the evaluating position, and wherein the measured gain detecting means comprises:

an adaptive notch filter for outputting a second control signal based on the reference signal of the certain order;

removing means for outputting a removed signal representing the sound effect at the evaluating position from which the second control signal has been removed; and filter coefficient updating means for sequentially updating a filter coefficient of the adaptive notch filter in order to minimize a component of the certain order of the removed signal based on the reference signal of the certain order and the removed signal, wherein the filter coefficient of the adaptive notch filter is detected as the measured gain of the certain order.

3. A sound effect generating device including:

traveling state detecting means for detecting a traveling state of a mobile body;

a waveform data table for storing one period of waveform data;

reference signal generating means for generating a reference signal of a harmonic wave based on the traveling state by successively reading the waveform data from the waveform data table;

acoustic control means for generating a control signal based on the reference signal;

gain adjusting means for storing a gain table, which stores a gain for the control signal in association with the traveling state, reading the gain from the gain table depending on the traveling state, which is detected by the traveling state detecting means, and outputting the control signal, which is adjusted in gain using the gain; and sound effect output means for outputting a sound effect corresponding to he control signal, which is adjusted in gain, wherein the sound effect generating device further comprises:

sound effect detecting means, disposed in an evaluating position near a passenger, for detecting the sound effect at the evaluating position;

gain comparing means for storing a signal transfer characteristic from the sound effect output means to the sound effect detecting means, correcting a gain of the sound effect, which is detected by the sound effect detecting means, with the signal transfer characteristic in order to calculate a measured gain of the sound effect when the sound effect output means outputs the sound effect, and comparing the measured gain with the gain in the gain table; and gain correcting means for correcting the gain for the control signal, which is adjusted in gain, based on the result of the comparison from the gain comparing means, wherein the gain comparing means compares the measured gain with the gain in the gain table at a specified frequency where a difference in sound volume level of a sound between when the sound effect generating device is in operation and when the sound effect generating device is not in operation shows a local maximal value, from among control frequencies for the control signal; or the gain correcting means corrects the gain for the control signal at the specified frequency.

4. A sound effect generating device including:

traveling state detecting means for detecting a traveling state of a mobile body;

a waveform data table for storing one period of waveform data;

reference signal generating means for generating a reference signal of a harmonic wave based on the traveling state by successively reading the waveform data from the waveform data table;

acoustic control means for generating a control signal based on the reference signal;

gain adjusting means for storing a gain table, which stores a gain for the control signal in association with the traveling state, reading the gain from the gain table depending on the traveling state, which is detected by the traveling state detecting means, and outputting the control signal, which is adjusted in gain using the gain; and sound effect output means for outputting a sound effect corresponding to the control signal, which is adjusted in gain, wherein the sound effect generating device further comprises:

sound effect detecting means, disposed in an evaluating position near a passenger, for detecting the sound effect at the evaluating position;

gain comparing means for storing a signal transfer characteristic from the sound effect output means to the sound effect detecting means, correcting a gain of the sound effect, which is detected by the sound effect detecting means, with the signal transfer characteristic in order to calculate a measured gain of the sound effect when the sound effect output means outputs the sound effect, and comparing the measured gain with the gain in the gain table; and gain correcting means for correcting the gain for the control signal, which is adjusted in gain, based on the result of the comparison from the gain comparing means, wherein the gain comparing means comprises measured gain detecting means for detecting a measured gain of the certain order from the sound effect at the evaluating position, and wherein the measured gain detecting means comprises:

an adaptive notch filter for outputting a second control signal based on the reference signal of the certain order;

removing means for outputting a removed signal representing the sound effect at the evaluating position from which the second control signal has been removed; and filter coefficient updating means for sequentially updating a filter coefficient of the adaptive notch filter in order to minimize a component of the certain order of the removed signal based on the reference signal of the certain order and the removed signal, wherein the filter coefficient of the adaptive notch filter is detected as the measured gain of the sound effect at the evaluating position.

5. A sound effect generating device for generating a sound effect as a pseudo-operating sound of a drive source of a vehicle, comprising:

control signal generating means for generating a control signal representing the sound effect;

sound effect output means for outputting the sound effect corresponding to the control signal; and sound effect detecting means for detecting the sound effect at an evaluating position, wherein the control signal generating means:

sets a reference sound volume level as a reference value for a sound volume level of the sound effect when the vehicle is in a prescribed traveling state;

compares a measured sound volume level of the sound effect, which is detected by the sound effect detecting means when the vehicle is in the prescribed traveling state, with the reference sound volume level; and corrects a gain of the control signal based on the result of the comparison, and wherein, if the measured sound volume level of the sound effect is compared with the reference sound volume level, the control signal generating means compares the measured sound volume level with the reference sound volume level at a specified frequency where a difference in sound volume level of a sound between when the sound effect generating device is in operation and when the sound effect generating device is not in operation shows a local maximal value, from among control frequencies for the control signal; or if the gain of the control signal is corrected, the control signal generating means corrects the gain of the control signal at the specified frequency, from among control frequencies for the control signal.

6. A sound effect generating device for generating a sound effect as a pseudo-operating sound of a drive source of a vehicle, comprising:

control signal generating means for generating a control signal representing the sound effect;

sound effect output means for outputting the sound effect corresponding to the control signal; and sound effect detecting means for detecting the sound effect at an evaluating position, wherein the control signal generating means comprises measured sound volume level detecting means for detecting a measured sound volume level of the sound effect detected by the sound effect detecting means when the vehicle is in a prescribed traveling state, and wherein the control signal generating means:

sets a reference sound volume level as a reference value for a sound volume level of the sown effect when the vehicle is in a prescribed traveling state; and compares a measured sound volume level of the sound effect, which is detected by the measured sound volume level detecting means, with the reference sound volume level; and corrects a gain of the control signal based on the result of the comparison, and wherein the measured sound volume level detecting means comprises:

an adaptive notch filter for outputting a second control signal based on the reference signal of the certain order for generating the control signal;

removing means for outputting a removed signal representing the sound effect at the evaluating position from which the second control signal has been removed; and filter coefficient updating means for sequentially updating a filter coefficient of the adaptive notch filter in order to minimize a component of the certain order of the removed signal based on the reference signal of the certain order and the removed signal, wherein the filter coefficient of the adaptive notch filter is detected as the measured sound volume level of the certain order.

* * * * *

UNITED STATES PATENT AND TRADEMARK OFFICE

CERTIFICATE OF CORRECTION

PATENT NO. : 8,942,836 B2
APPLICATION NO. : 13/380679
DATED : January 27, 2015
INVENTOR(S) : Toshio Inoue and Yasunori Kobayashi It is certified that error appears in the above-identified patent and that said Letters Patent is hereby corrected as shown below:

Title Page, Item 87:
Change "Jun. 1, 2011" to -- Jan. 6, 2011 --

Signed and Sealed this
Seventh Day of July, 2015

Michelle K. Lee

Michelle K. Lee
*Director of the United States Patent and Trademark Office*